May 23, 1961 J. F. AHEARN ET AL 2,985,707
ELECTRICAL COOLING SYSTEM
Filed April 16, 1956
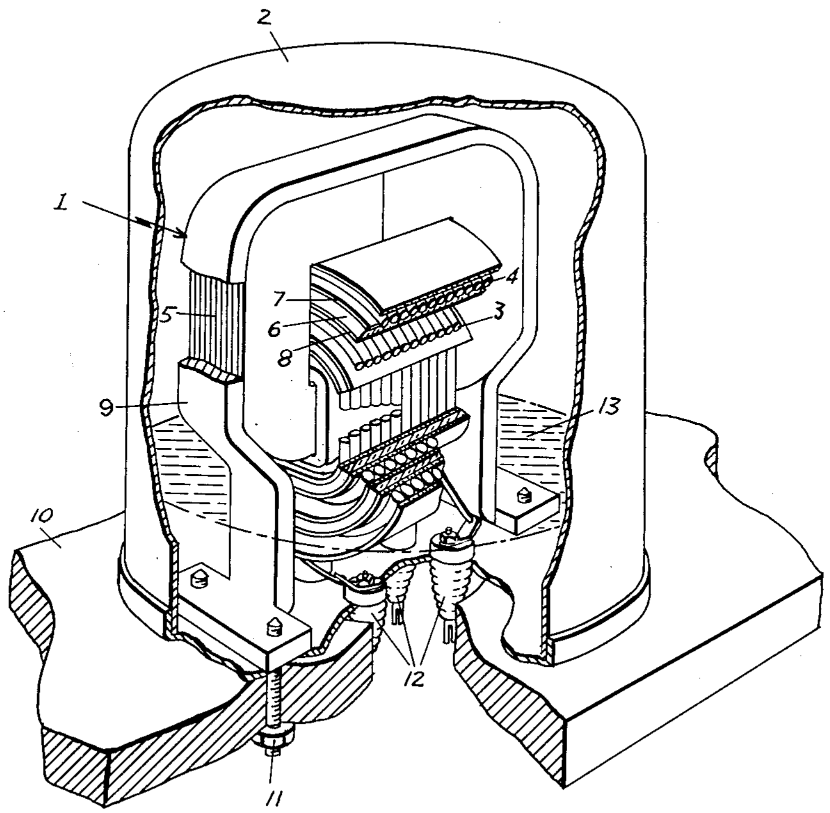
INVENTORS
JOHN FRANCIS AHEARN
LOUIS FREDERICK KILHAM, JR.
BY Elmer J. Gorn
ATTORNEY 2,985,707
Patented May 23, 1961

2,985,707

ELECTRICAL COOLING SYSTEM

John Francis Ahearn, Reading, and Louis Frederick Kilham, Jr., Concord, Mass., assignors to Raytheon Company, a corporation of Delaware Filed Apr. 16, 1956, Ser. No. 578,411
3 Claims. (Cl. 174—15)

This invention relates to a cooling system and more particularly to a system for cooling electrical apparatus by means of a minimum amount of volatile inert liquid.

In this invention there is disclosed a cooling system comprising a heat-producing electrical apparatus hermetically sealed in a case and a volatile inert liquid located within said case and contacting said electrical apparatus by capillary action. Copending application, Serial No. 578,510, filed April 16, 1956, by John Francis Ahearn and William L. Root, Jr., entitled "Electrical Cooling System," describes a cooling system utilizing a volatile inert liquid. Copending application, Serial No. 578,389, filed April 16, 1956, by John Francis Ahearn, entitled "Electrical Cooling System," describes a cooling system utilizing a mixture of volatile inert liquids. In systems of this type, cooling of the electrical apparatus is achieved by means of the volatile liquid, which vaporizes due to the heat absorbed from inside the hermetically sealed case. As the temperature of the electrical apparatus increases, the amount of vapor increases, thereby increasing the internal pressure within said case. The vapors release the heat by condensing on the side of said case, thereby producing an automatic demand cooling system that produces the necessary amount of cooling as demanded by the heat produced by said electrical apparatus. The vapors produced by said volatile liquid serve the dual purpose of cooling and also supplying the necessary dielectric strength needed to prevent arcing at the points of high potential gradient. A volatile liquid as used herein is defined as one having a boiling point under 250° C. at atmospheric pressure.

This invention is particularly adaptable for cooling single components, or whole assemblies of electric and electromagnetic components of electronic equipment that operate at substantially high operating potentials and have an inherently high temperature rise under operating conditions. These two conditions of high potential and high temperature may exist separately or concurrently, depending upon function and inherent characteristics. Cooling and insulating are accomplished by enclosing the electrical apparatus in a hermetically sealed case which is partially filled with an inert noncorrosive and preferably noninflammable volatile liquid. The case must be sufficiently strong in order to withstand the appreciable vapor pressure that is developed at normal operating temperatures. Suitable liquids are the perfluorinated amines, ethers, hydrocarbons and related compounds. In the preferred embodiments, perfluorobutyl cyclic ether, $C_8F_{16}O$ was found to have desirable chemical and physical properties for those units designed to operate in ambients of 60° C., or lower. For higher ambients a less volatile liquid is preferred in order to avoid excessive pressures which would then require larger and stronger cases. For higher ambient temperatures, perfluorotributyl amine $(C_4H_9)_3$ has been found to have desirable characteristics. In place of the compounds mentioned, other volatile compounds, separately or in combination, such as those listed below, may be used.

| | |
|---|---|
| Perfluoromethylcyclohexane | B.P. 76 deg. C. |
| Perfluorodimethylcyclohexane | B.P. 102 deg. C. |
| Perfluorokerosene | B.P. 140–215 deg. C. |
| Monochlorotrifluoroethylene dimer | B.P. 135 deg. C. |
| Monochlorotrifluoroethylene trimer | B.P. 205 deg. C. |

The use of volatile inert liquids as a cooling medium has many advantages in that they are more effective than conventional coolants in the dissipation of heat resulting from within the unit. It is now possible, therefore, to achieve a much lower temperature rise for a given unit or conversely greater power output for the same temperature rise. The advantages are smaller size and weight, and a lower cost for a unit of given power rating. This invention results, therefore, in a system that reduces to a minimum the weight of volatile cooling liquid required, and also a system wherein the pressures rising within a hermetically sealed container are greatly reduced.

Further objects and advantages of this invention will be apparent by referring now to the accompanying drawing, where there is shown a cutaway view of a transformer 1 hermetically sealed in a case 2. Transformer 1 consists of primary windings 3 and secondary windings 4 wound about a laminated core 5. Separating primary windings 3 and 4 is a suitable insulating material 6 having a capillary material 7 and 8 connected on each side of said material 6 in such a manner that said capillary material 7 and 8 contacts the heat-generating windings 3 and 4. The capillary material 7 and 8 should be porous and may be of laminated fibrous or woven structure located at a point on the transformer 1 where maximum heat will be developed. Support member 9 has a dual purpose of supplying structural rigidity to core 5 and also the means for conducting away heat from said core 5. Both hermetically sealed case 2 and transformer 1 are attached to a steel mounting plate 10 by means of screws 11 in such a manner that plate 10 acts as a support, also as a heat sink for the heat conducted from core 5 to support 9 and ultimately through screws 11 to plate 10. The electrical connection connected to the primary and secondary windings 3 and 4 are connected to suitable compressional terminals 12.

Located within said case 2 is a volatile inert liquid 13 of the type previously mentioned. Under normal operating conditions capillary material 7 and 8 will contact the volatile inert liquid thereby resulting in the liquid being raised by capillary action through said capillary material to an appreciable height above the surface of the liquid. The liquid, upon coming in contact with the hot windings 3 and 4, will vaporize thereby causing a transfer of heat from the windings by the vapor phase heat exchange method. The vapors will then condense on the inner surface of case 2 and ultimately return to the mass of liquid 13 thereby completing the cycle. An example of a preferred type of capillary material is asbestos paper partially saturated with cured silicone resin thereby enhancing the tensile strength. It will be observed that members 7 and 8 are incorporated in the unit in such a way that a substantial portion therein is in close proximity with the particular area to be cooled, such as the copper windings or laminations of transformer 1. In order to benefit fully from this type of cooling action, it is essential that a portion of the capillary material contact the volatile liquid either directly or through suitable wick-acting components.

In electrical components comprising metal laminations, such as the core of a transformer or choke, it has been discovered that improved cooling can be achieved if the laminations are mounted in a vertical plane with the lower extremity thereof, dipping into the volatile inert liquid coolant. Improved cooling is achieved since the liquid coolant rises by capillary action in the minute spaces existing between said laminations and is thereby carried into the hottest areas which are to be cooled. In the nonoperating condition, the major portion of volatile liquid resides in the bottom portion of the case. A substantial quantity, however, rises by capillary action into the windings, core or other heat-generating areas. Upon operation of the unit, heat generated, for example, from resistive and hysteresis losses will cause a volatilization of the liquid which has, by capillary action, been brought in close proximity with such parts. The vapors produced eventually fill the free space of the case, and, upon coming in contact with the cooler inner surface of the case, will condense back to liquid form, thereby yielding their latent heat of vaporization to the case. During the process just mentioned, the condensed liquid will fall back to the reservoir in the bottom of the case, but, in addition, a portion of the liquid will drip from the top surface of the case directly onto the unit, thereby resulting in additional cooling.

Since capillary rise is ordinarily limited to a few inches, it might be inferred that the invention is limited in its application to units of comparatively small size. However, this is not the case, since it is only necessary that the liquid rise vertically in the solid capillary member a sufficient distance in order to bring said liquid in proximity with a part of the unit hot enough to start volatilization. Once volatilization begins resulting condensate will drop directly over the hot areas, thereby maintaining a continued transferred cycle. It can be seen, therefore, that a reservoir containing a small volume of liquid rising by capillary action to a height of not more than 3 or 4 inches will serve to provide effective cooling for a unit of much larger dimension than the capillary rise.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embdiment disclosed herein except as defined by the appended claims.

What is claimed is:

1. A cooling system comprising a heat-producing electrical apparatus having stacked laminations and hermetically sealed in a case, a capillary material being located in said case and contacting internal portions of said electrical apparatus, a volatile inert liquid being located in said case and contacting said capillary material and said stacked laminations, said liquid thereby rising to the internal portions of said electrical apparatus by capillary action through a first path between said laminations and a second path through said capillary material.

2. A cooling system comprising a heat-producing electrical apparatus having stacked laminations and hermetically sealed in a case, a capillary material being located in said case and contacting internal portions of said electrical apparatus, a volatile inert liquid being located in said case and contacting said capillary material and said stacked laminations, said liquid thereby rising to the internal portions of said electrical apparatus by capillary action through a first path between said laminations and a second path through said capillary material, the vaporization of said liquid cooling said electrical apparatus and the vapors providing the dielectric strength for insulating said electrical apparatus.

3. A transformer located within an hermetically sealed case comprising, a core and at least a primary winding element and a secondary winding element wound about said core in a stacked overlying arrangement, each such element consisting of a plurality of adjacent wound turns of insulated wire, the adjacent turns of such winding presenting substantially continuous inner and outer winding surfaces, and a layer of capillary material placed adjacent each inner and outer winding surface to provide a composite winding element, each such composite winding element overlying said core and forming successive coaxial elemental layers about said core, a sheet of insulating material interposed between successive overlying composite winding elements, a dielectric cooling liquid partially filling said case to a level sufficient to contact a portion of said capillary material of each elemental layer, said liquid rising by capillary action to the internal portions of said winding elements, the vaporization of said liquid cooling said transformer, and the vapors providing dielectric strength for insulating said transformer.

References Cited in the file of this patent

UNITED STATES PATENTS

| | | |
|---|---|---|
| 1,155,701 | Bliss | Oct. 5, 1915 |
| 2,083,611 | Marshall | June 15, 1937 |
| 2,161,413 | Gooding et al. | June 6, 1939 |
| 2,216,010 | Hobart | Sept. 24, 1940 |
| 2,350,348 | Gaugler | June 6, 1942 |
| 2,388,566 | Paluev | Nov. 6, 1945 |
| 2,643,282 | Greene | June 23, 1953 |

FOREIGN PATENTS

| | | |
|---|---|---|
| 481,770 | Great Britain | Mar. 17, 1938 |
| 495,610 | Canada | Aug. 25, 1953 |

OTHER REFERENCES

RT&E Transformers . . . with wick-fed oil-filled bushings, "Electrical World," Oct. 5, 1953, page 156.